US005700351A

United States Patent [19]

Schuhmacher et al.

[11] Patent Number: 5,700,351
[45] Date of Patent: *Dec. 23, 1997

[54] ANTIFOAMS BASED ON OIL-IN-WATER EMULSIONS FOR THE PAPER INDUSTRY

[75] Inventors: Rudolf Schuhmacher, Boehl-Iggelheim; Gabriele Dralle-Voss, Darmstadt; Knut Oppenlaender, Ludwigshafen; Brigitte Wegner, Roemerberg; Andreas Hohmann, Ludwigshafen, all of Germany

[73] Assignee: BASF Aktiengesellschaft, Ludwigshafen, Germany

[*] Notice: The term of this patent shall not extend beyond the expiration date of Pat. No. 5,326,499.

[21] Appl. No.: 379,442

[22] PCT Filed: Sep. 18, 1993

[86] PCT No.: PCT/EP93/02531

§ 371 Date: Feb. 6, 1995

§ 102(e) Date: Feb. 6, 1995

[87] PCT Pub. No.: WO94/08091

PCT Pub. Date: Apr. 14, 1994

[30] Foreign Application Priority Data

Sep. 28, 1992 [DE] Germany .................. 42 32 415.7

[51] Int. Cl.⁶ .................. D21H 21/12; B01D 19/04
[52] U.S. Cl. .................. 162/75; 162/179; 252/321; 252/358
[58] Field of Search .................. 162/75, 76, 72, 162/158, 179; 252/321, 358

[56] References Cited

U.S. PATENT DOCUMENTS

| | | | |
|---|---|---|---|
| 2,346,928 | 4/1944 | Lighthipe | 106/131 |
| 2,715,614 | 8/1955 | Snook | 252/358 |
| 2,762,780 | 9/1956 | Kulakow | 252/321 |
| 3,248,289 | 4/1966 | Shinozaki et al. | 167/53 |
| 3,951,853 | 4/1976 | Suwala | 252/321 |
| 4,009,119 | 2/1977 | Poschmann et al. | 252/321 |
| 4,208,301 | 6/1980 | Gammon | 252/321 |
| 4,221,600 | 9/1980 | Alexander | 252/321 |
| 4,454,113 | 6/1984 | Hemker | 252/312 |
| 4,664,844 | 5/1987 | Bergold et al. | 252/358 |
| 4,895,681 | 1/1990 | Herrmann et al. | 252/321 |
| 4,976,888 | 12/1990 | De Clercq et al. | 252/358 |
| 5,326,499 | 7/1994 | Wegner et al. | 252/321 |
| 5,429,718 | 7/1995 | Morlino et al. | 162/72 |

FOREIGN PATENT DOCUMENTS 2074054   2/1993   Canada .

OTHER PUBLICATIONS

Chemical Abstract Acc #107:219850 of Melzer et al. DE 3601929 (Jul. 30, 1987).

*Primary Examiner*—William Beisner
*Attorney, Agent, or Firm*—Oblon, Spivak, McClelland, Maier & Neustadt, P.C.

[57] ABSTRACT

Antifoams based on oil-in-water emulsions, in which the oil phase accounts for from 5 to 50% by weight of the emulsions and consists essentially of a mixture of (a) fatty esters of $C_{12}$–$C_{22}$-carboxylic acids with monohydric to trihydric $C_1$–$C_{22}$-alcohols, (b) polyglyceryl esters which are obtainable by at least 20% esterification of polyglycerols which contain at least 2 glyceryl units with at least one $C_{12}$–$C_{36}$-fatty acid and (c) fatty esters of $C_{12}$–$C_{22}$-carboxylic acids and polyalkylene glycols, the molecular weight of the polyalkylene glycols being up to 5,000 g/mol, and, if required, (d) long-chain alcohols, fatty esters of alcohols of at least 22 carbon atoms and $C_1$–$C_{36}$-carboxylic acids, distillation residues which are obtainable in the preparation of alcohols having a relatively large number of carbon atoms by oxo synthesis or by the Ziegler process and which may be alkoxylated, and/or (e) hydrocarbons having a boiling point above 200° C. or fatty acids of 12 to 22 carbon atoms, are used for controlling foam in pulp digestion, in the beating of paper stock, in papermaking and in the dispersing of pigments for papermaking.

15 Claims, No Drawings

ANTIFOAMS BASED ON OIL-IN-WATER EMULSIONS FOR THE PAPER INDUSTRY

The present invention relates to antifoams for the paper industry, based on an oil-in-water emulsion, in which the oil phase accounts for from 5 to 50% by weight of the emulsion and consists essentially of a mixture of esters of long-chain carboxylic acids and, if required, conventional hydrophobic compounds, such as alcohols of at least 12 carbon atoms, distillation residues which are obtainable in the preparation of alcohols having a relatively large number of carbon atoms by oxo synthesis or by the Ziegler process and which may be alkoxylated, and/or hydrocarbons having a boiling point above 200° C. or fatty acids of 12 to 22 carbon atoms.

The prior unpublished European Patent Application No. 92113458.1 discloses antifoams for the paper industry, based on an oil-in-water emulsion, in which the oil phase accounts for from 5 to 50% by weight of the emulsion and contains (a) an alcohol of at least 12 carbon atoms, fatty esters of alcohols of at least 22 carbon atoms and $C_1$–$C_{36}$-carboxylic acids, distillation residues which are obtainable in the preparation of alcohols having a relatively large number of carbon atoms by oxo synthesis or by the Ziegler process and which may be alkoxylated, a mixture of the stated compounds and/or (b) a fatty ester of a $C_{12}$–$C_{22}$-carboxylic acid with a monohydric to trihydric $C_1$–$C_{18}$-alcohol and, if required, (c) a hydrocarbon having a boiling point above 200° C. or a fatty acid of 12 to 22 carbon atoms in combination with (d) from 1 to 80% by weight of polyglyceryl esters which are obtainable by at least 20% esterification of a polyglycerol mixture comprising from 0 to 10% by weight of monoglycerol,
from 15 to 40% by weight of diglycerol,
from 30 to 55% by weight of triglycerol,
from 10 to 25% by weight of tetraglycerol,
from 0 to 15% by weight of pentaglycerol,
from 0 to 10% by weight of hexaglycerol and
from 0 to 5% by weight of polyglycerols having higher degrees of condensation with at least one fatty acid of 12 to 36 carbon atoms. These oil-in-water emulsions are efficient antifoams in papermaking even at above 35° C., for example at from 50° to 60° C. In contrast, other known antifoams based on oil-in-water emulsions which are usually used in papermaking become less efficient when the temperature of the aqueous system to be defoamed increases to above 35° C. At even higher temperatures, a more rapid decrease in the efficiency of the antifoams then occurs when the known oil-in-water emulsions are used. Since there is an increasing trend toward closed water circulations in the paper mills, the result is an increase in the temperature of the circulated water in papermaking, so that the efficiency of the antifoams used to date substantially decreases.

It is an object of the present invention to provide antifoams which are still sufficiently efficient even at relatively high temperatures for the water circulations in the paper mills.

We have found that this object is achieved, according to the invention, by antifoams for the paper industry, based on an oil-in-water emulsion, in which the oil phase accounts for from 5 to 50% by weight of the emulsion and consists essentially of the mixture of (a) fatty esters of $C_{12}$–$C_{24}$-carboxylic acids with monohydric to trihydric $C_1$–$C_{22}$-alcohols, (b) polyglyceryl esters which are obtainable by at least 20% esterification of polyglycerols which contain at least 2 glycerol units with at least one $C_{12}$–$C_{36}$-fatty acid and (c) fatty esters of $C_{12}$–$C_{22}$-carboxylic acids and polyalkylene glycols, the molecular weight of the polyalkylene glycols being up to 5,000 g/mol, and, if required, (d) alcohols of at least 12 carbon atoms, fatty esters of alcohols of at least 22 carbon atoms and $C_1$–$C_{36}$-carboxylic acids, distillation residues which are obtainable in the preparation of alcohols having a relatively large number of carbon atoms by oxo synthesis or by the Ziegler process and which may be alkoxylated, a mixture of the stated compounds and/or (e) hydrocarbons having a boiling point above 200° C. or fatty acids of 12 to 22 carbon atoms.

Fatty esters of $C_{12}$–$C_{22}$-carboxylic acids with a monohydric to trihydric $C_1$–$C_{22}$-alcohol are used as components (a) of the oil phase of the antifoam emulsion. The fatty acids on which the esters are based are, for example, lauric acid, myristic acid, palmitic acid, stearic acid, arachidic acid and behenic acid. Palmitic acid or stearic acid is preferably used for the preparation of the esters. Monohydric $C_1$–$C_{18}$-alcohols, e.g. methanol, ethanol, n-propanol, isopropanol, n-butanol, isobutanol, hexanol, decanol, palmityl alcohol and stearyl alcohol, as well as dihydric alcohols, such as ethylene glycol, propylene glycol, 1,6-hexanediol or 1,4-butanediol, and trihydric alcohols, such as glycerol, may be used for the esterification of the stated carboxylic acids. The polyhydric alcohols may be completely or partially esterified. This class of compounds also includes the naturally occuring vegetable and essential fatty esters, for example coconut oil, palm oil, soybean oil, rapeseed oil and olive oil, or various tallow varieties and oils of animal origin, for example beef tallow, lard, fish oil and whale oil. The compounds of the group (a) can be used in the form of individual defined esters or in the form of mixtures for the preparation of the oil phase of the antifoam emulsions and are present in the oil phase in an amount of from 1 to 90, preferably from 40 to 80, % by weight.

Polyglyceryl esters which are obtainable by at least 20% esterification of polyglycerols which contain at least two glycerol units with at least one $C_{12}$–$C_{36}$-fatty acid are used as compounds of group (b). The polyglycerols on which the esters are based are esterified at least to such an extent that compounds which are virtually insoluble in water are formed. The polyglycerols are obtained in a conventional manner by alkali-catalyzed condensation of glycerol at elevated temperatures or by reacting epichlorohydrin with glycerol in the presence of an acidic catalyst (cf. for example Fette, Seifen, Anstrichmittel, 88th year, No. 3 (1986), pages 101–106). As a rule, the two stated processes give product mixtures which contain polyglycerols having at least 2 glycerol units. The distribution of the individual polymers may vary depending on preparation. The polyglycerols usually contain from at least 2 to about 30, preferably from 2 to 12, polymerized glycerol units. For example, polyglycerols which contain the polymeric glycerols in the following amounts are commercially available:

from 15 to 40% by weight of diglycerol,
from 30 to 55% by weight of triglycerol,
from 10 to 25% by weight of tetraglycerol,
from 0 to 15% by weight of pentaglycerol,
from 0 to 10% by weight of hexaglycerol and from 0 to 5% by weight of polyglycerols having a higher degree of condensation.

Polyglycerols having at least 2 glycerol units are esterified with at least one fatty acid of at least 12 to 36, preferably 16 to 30, carbon atoms in the molecule. The degree of esterification of the OH groups in the polyglycerols is from at least 20 to 100%, preferably from 60 to 100%. The long-chain fatty acids used for esterification may be saturated or ethylenically unsaturated. Examples of suitable fatty acids are lauric acid, myristic acid, palmitic acid, stearic acid, arachidic acid, behenic acid, oleic acid, hexadecanoic acids, elaidic acid, eicosenoic acids, docosenoic acids, such as erucic acid or prasidic acid, and polyethylenically unsaturated acids, such as octadecadienoic acids and octadecatrienoic acids, e.g. linoleic acid and linolenic acid, mixtures of the stated saturated carboxylic acids, mixtures of the stated unsaturated carboxylic acids and mixtures of the saturated and ethylenically unsaturated carboxylic acids as well as montanic acid. In addition to mixtures of the polyglycerols, the pure polymers which are at least 20% esterified, for example esters of diglycerol, triglycerol, tetraglycerol, pentaglycerol or hexaglycerol or esters of polyglycerols having a high degree of condensation, may also be used as compounds of component (b). The polyglyceryl esters are usually prepared in the presence of an acidic esterification catalyst, such as sulfuric acid, p-toluene-sulfonic acid, citric acid, phosphorous acid, phosphoric acid or hypophosphorous acid, or a basic catalyst, such as sodium methylate or potassium tert-butylate.

The compounds of component (b) are present in the oil phase in an amount of from 1 to 80, preferably from 5 to 20, % by weight.

Suitable components (c) of the oil phase are fatty esters of $C_{12}$–$C_{22}$-carboxylic acids and polyalkylene glycols which have a molecular weight up to 5,000 g/mol. The carboxylic acids on which the esters are based have been stated above in the description of the component (a). Examples of suitable polyalkylene glycols are polyethylene glycol, polypropylene glycol and polybutylene glycol, as well as block copolymers of ethylene oxide and propylene oxide, of ethylene oxide and butylene oxide and of ethylene oxide, propylene oxide and butylene oxide. The copolymers may also contain the alkylene oxide as randomly distributed polymerized units. The molecular weight of the polyalkylene glycols is up to 5,000 g/mol. The polyalkylene glycols contain at least 2 polymerized alkylene oxide units, such as ethylene oxide units. Polyethylene glycols having molecular weights of from 200 to 1,000 and block copolymers of ethylene oxide and propylene oxide having a molecular weight of from 500 to 2,000 g/mol are preferably used as esterification components for the fatty acids. Ethylene oxide and propylene oxide may be reacted in any ratio for the preparation of the block copolymers.

The block copolymers and the random copolymers usually contain from 5 to 50, preferably from 20 to 40, % by weight of ethylene oxide and from 50 to 95, preferably from 60 to 80, % by weight of propylene oxide as polymerized units. The compounds of group (c) can be prepared by esterifying the abovementioned polyalkylene glycols with $C_{16}$–$C_{20}$-carboxylic acids, such as palmitic acid or stearic acid, or alkylene oxides, e.g. ethylene oxide or a mixture of ethylene oxide and propylene oxide (random or in blocks), are subjected to an addition reaction with a $C_{12}$–$C_{22}$-carboxylic acid and the remaining free OH group of the polyetherester is then esterified with a $C_{12}$–$C_{22}$-carboxylic acid. The long-chain carboxylic acid used for the esterification may be the same as or different from that which was subjected to the alkoxylation reaction. The fatty esters of component (c) are present in the oil phase in an amount of from 1 to 80, preferably from 5 to 20, % by weight.

In addition to the components (a), (b) and (c), the oil phase of the antifoam emulsions may also contain components usually used in antifoam mixtures. Examples of these are the compounds of group (d). These include alcohols of at least 12 carbon atoms, fatty esters of alcohols of at least 22 carbon atoms and $C_1$–$C_{36}$-carboxylic acids, distillation residues which are obtainable in the preparation of alcohols having a relatively large number of carbon atoms by oxo synthesis or by the Ziegler process and which may be alkoxylated, and mixtures of the stated compounds.

In particular, alcohols of at least 12 carbon atoms or mixtures of alcohols are used as component (d) of the oil phase of the oil-in-water emulsions. These are as a rule monohydric alcohols which contain up to 48 carbon atoms in the molecule. Such products are commercially available. However, fatty alcohols which have a substantially larger number of carbon atoms in the molecule may also be used as component (d). The alcohols of component (d) are either natural or synthetic alcohols. For example, lauryl alcohol, myristyl alcohol, cetyl alcohol, palmityl alcohol, stearyl alcohol, behenyl alcohol, oleyl alcohol, ricinyl alcohol, linoleyl alcohol and erucyl alcohol are suitable.

Mixtures of alcohols, for example mixtures of (1) alcohols of 12 to 26 carbon atoms and (2) alcohols of 28 to 48 carbon atoms, may also be used as component (d).

The synthetic alcohols, which are obtainable, for example, by oxidation of aluminum alkyls by the Ziegler process, are saturated, straight-chain alcohols. Synthetic alcohols are also obtained by oxo synthesis. As a rule, mixtures of alcohols are obtainable. Distillation residues which are obtained in the preparation of the abovementioned alcohols by oxo synthesis or by the Ziegler process can also be used as component (d) of the oil phase of the antifoam emulsions. Alkoxylated distillation residues which are obtained in the abovementioned processes for the preparation of higher alcohols by oxo synthesis or by the Ziegler process are also suitable as component (d) of the oil phase of the antifoam emulsions. The oxyalkylated distillation residues are obtained by alkoxylating the distillation residues with ethylene oxide or with propylene oxide or with a mixture of ethylene oxide and propylene oxide by known methods. Up to 5 ethylene oxide or propylene oxide groups undergo addition per OH group of the alcohol in the distillation residue. Preferably, from 1 to 2 ethylene oxide groups undergo addition per OH group of the alcohol in the distillation residue.

Other suitable components (d) are fatty esters of alcohols of at least 22 carbon atoms and $C_1$–$C_{36}$-carboxylic acids, for example montan waxes or Carnauba waxes. The compounds of component (d) are, if required, used in the oil phase of the antifoam emulsions in an amount of up to 80, preferably up to 10, % by weight, based on components (a), (b) and (c).

The novel oil-in-water emulsions can, if required, contain a further group of conventional components of oil antifoams, ie. (e) hydrocarbons having a boiling point above 200° C. or fatty acids of 12 to 22 carbon atoms. The compounds of group (e) are present in the oil phase in an amount of up to 50, preferably up to 20, % by weight, based on the components (a), (b) and (c).

The novel antifoam emulsions are prepared by emulsifying the oil phase in the aqueous phase. To do this, either the components (a), (b) and (c) and, if required, (d) and/or (e) can be emulsified individually in the aqueous phase, or a mixture of the components (a), (b), (c) and, if required, (d)

and/or (e) is first prepared and this mixture is then emulsified in the aqueous phase. The oil phase accounts for from 5 to 50% by weight of the oil-in-water emulsions, while the amount of the aqueous phase in the emulsions is from 95 to 50% by weight, the percentages by weight summing to 100. The oil phase consists essentially of the mixture of components (a) to (c) and, if required, (d) and/or (e). Owing to equilibria, however, the possibility of certain components of the aqueous phase also passing into the oil phase cannot be ruled out. However, the oil phase of the novel antifoam emulsions consists of at least 99% by weight of the components (a) to (c) and, if required, (d) and/or (e).

To emulsify the oil phase in the aqueous phase, apparatuses in which the components of the emulsion are subjected to a strong shear gradient, for example dispersers, are required. In order to obtain particularly stable oil-in-water emulsions, the emulsification of the oil phase in the aqueous phase is preferably carried out in the presence of surfactants which have an HLB value of more than 6 (for the definition) of the HLB value, see W. C. Griffin, Journal of the Society of Cosmetic Chemists, 5 (1954), 249–256). The surfactants are oil-in-water emulsifiers or typical wetting agents. Among the surfactants, it is possible to use anionic, cationic or nonionic compounds or mixtures of these compounds which are compatible with one another, for example mixtures of anionic and nonionic or of cationic and nonionic wetting agents. Substances of the stated type are, for example, sodium salts or ammonium salts of higher fatty acids, such as ammonium oleate or ammonium stearate, oxyalkylated alkylphenols, such as nonylphenol or isooctylphenol, which are reacted with ethylene oxide in a molar ratio of from 1:2 to 1:50, oxyethylated unsaturated oils, for example the reaction products of one mol of castor oil and from 30 to 40 mol of ethylene oxide or the reaction products of one mol of sperm alcohol with from 60 to 80 mol of ethylene oxide. Preferably used emulsifiers are also sulfated oxyethylation products of nonylphenol or octylphenol, which are present as the sodium or ammonium salt of the corresponding sulfuric half-ester, or benzenesulfonic and alkylbenzenesulfonic acids and salts thereof. 100 parts by weight of the oil-in-water emulsions usually contain from 0.1 to 5 parts by weight of an emulsifier or of an emulsifier mixture. In addition to the abovementioned emulsifiers, protective colloids, such as high molecular weight polysaccharides and soaps, or other conventional additives, such as stabilizers, may be used in the preparation of the oil-in-water emulsions. For example, the addition of from 0.05 to 0.5% by weight, based on the total emulsion, of high molecular weight, water-soluble homo- and copolymers of acrylic acid, methacrylic acid, acrylamide or methacrylamide as a stabilizer has proven useful. The use of such stabilizers forms the subject of, for example, EP-B-0 149 812.

By emulsifying the oil phase in the aqueous phase, oil-in-water emulsions which have a viscosity of from 300 to 3,000 mPa.s immediately after preparation and in which the oil phase has a mean particle size of less than 25 μm, preferably from 0.5 to 15 μm, are obtained.

Although the mixtures of the components (a) and (b) or (a) and (c) alone have little efficiency as antifoams based on oil-in-water emulsions, surprisingly a synergistic effect occurs when a compound of component (b) is combined with compounds (a) and (c). The novel oil-in-water emulsions are used in the paper industry in aqueous systems in which the formation of foam, particularly at elevated temperatures, must be controlled, for example in pulp digestion, the beating of paper stock, papermaking with paper machines with closed circulations and the dispersing of pigments for papermaking. From 0.02 to 0.5, preferably from 0.05 to 0.3, part by weight of the oil-in-water antifoam emulsion is used per 100 parts by weight of paper stock in a foam-forming medium.

When added to a paper stock suspension, the novel antifoams also effect deaeration and are therefore also used as deaerators in papermaking (in addition to the paper stock). They are also suitable as antifoams in the coating of the paper, where they are added to coating strips. The antifoams can also be used in the food industry, in the starch industry and in wastewater treatment plants for foam control. If they are added to the paper stock as a deaerator, the amounts used for this purpose are from 0.02 to 0.5 part by weight per 100 parts by weight of paper stock.

In the Examples which follow, parts and percentages are by weight. The mean particle size of the particles of the oil phase emulsified in water was determined with the aid of a Coulter counter. The K value of the polymers was determined in aqueous solution at 25° C. and at a concentration of 0.5% by weight at pH 7 according to H. Fikentscher, Cellulose-Chemie 13 (1932), 58–64 and 71–74.

EXAMPLE 1

An oil-in-water emulsion in which the oil phase accounts for 29% by weight of the emulsion and has a mean particle size of from 2 to 10 μm is prepared with the aid of a dispersant.

The oil phase consists of the following components:
(a) 18 parts of a glyceryl triester of $C_{16}$–$C_{18}$-fatty acids,
(b) 5 parts of a polyglyceryl ester which is obtainable by esterifying a mixture of polyglycerols comprising
  27% of diglycerol,
  44% of triglycerol,
  19% of tetraglycerol and
  10% of polyglycerols having a higher degree of condensation with a $C_{12}$–$C_{26}$-fatty acid mixture, the degree of esterification being 60% and
(c) 2 parts of a fatty ester which is obtainable by esterifying a $C_{16}$–$C_{18}$-fatty acid mixture with a block copolymer of ethylene oxide and propylene oxide in a molar ratio of 3:7, having a molecular weight of 1,200 g/mol.

The aqueous phase consists of 3 parts of an emulsifier which is obtainable by subjecting 25 mol of ethylene oxide to an addition reaction of 1 mol of isooctylphenol and esterifying the adduct with sulfuric acid to give the half-ester, and one part of a copolymer of 70% of acrylamide and 30% of acrylic acid, having a K value of 270, 0.2 part of sodium hydroxide solution and 70 parts of water.

The components (a), (b) and (c) are first heated to 110° C. and then added to the aqueous phase heated to 80° C., with dispersing. The oil-in-water emulsion obtainable in this manner has a viscosity of 540 mPa.s at 20° C. immediately after the preparation.

COMPARATIVE EXAMPLE 1

According to EP-A-0 140 812, an oil phase is first prepared by mixing the following components:
23 parts of a mixture of fatty $C_{12}$–$C_{26}$-alcohols,
5 parts of a glyceryl triester of $C_{16}$–$C_{18}$-fatty acids and
1 part of a mineral oil (commercial white oil).
The aqueous phase consists of:
3 parts of an emulsifier which is obtainable by subjecting 25 mol of ethylene oxide to an addition reaction with 1 mol of isooctylphenol and esterifying the adduct with sulfuric acid to give the half-ester, 1 part of a copolymer of 70% of acrylamide and 30% of acrylic acid, having a K value of 270, 0.2 part of sodium hydroxide solution and 65 parts of water.

The oil phase described above is first heated to 110° C. and is then added to the aqueous phase heated to 80° C., with dispersing. The oil-in-water emulsion obtainable in this manner has a viscosity of 1,830 mPa.s and a particle size of 2–10 µm at 20° C. immediately after the preparation.

COMPARATIVE EXAMPLE 2

Using the method stated in Example 1, an oil phase comprising 18 parts of the glyceryl ester of $C_{16}$–$C_{18}$-fatty acids (=components (a) according to the Example) and 7 parts of the polyglyceryl ester of component (b) of the Example is emulsified in the aqueous phase also stated in said Example. An oil-in-water emulsion which has a viscosity of 760 mPa.s and a mean particle size of from 2 to 10 µm at 20° C. immediately after the preparation is obtained.

COMPARATIVE EXAMPLE 3

The procedure described in Example 1 is used, except that 18 parts of component (a) described there and 7 parts of component (c) described in the Example are used as the oil phase. An antifoam emulsion which has a viscosity of 920 mPa.s at 20° C. and a mean particle size of from 2 to 10 µm immediately after the preparation is obtained.

The oil-in-water emulsion obtained in the Example and the emulsions according to Comparative Examples 1 to 3 are tested with regard to their efficiency in a paper stock suspension. The efficiency of the antifoam emulsions is determined by measuring the foam value. The following procedure is used for this purpose:

5 l of a 0.1% foam-forming paper stock suspension (groundwood) are circulated for 5 minutes in a trough consisting of transparent plastic. The amount of foam formed on the surface of the stock suspension is then measured with the aid of a grid on the wall of the trough in area units (cm$^2$) and is expressed as the foam value for evaluating the efficiency of an antifoam.

The paper stock suspension is circulated in the absence of an antifoam for 5 minutes, a foam value of from 1,200 to 1,250 cm$^2$ being obtained. By adding 2 mg/l of an effective antifoam (a total of 10 mg of solid) to the paper stock suspension, this value is substantially reduced, so that it is a measure of the efficiency of an antifoam.

Testing of the antifoams:

The temperature of the paper stock suspension described above is 50° C., the temperature being kept constant to ±1° C. during the 5 minute test.

The efficiency of the antifoam is expressed as a percentage of residual foam R:

$$R = \frac{F_e \cdot 100}{F_0}$$

where $F_e$ is the foam value measured after the addition of an antifoam and $F_O$ is the foam zero value, ie. the value measured in the absence of an antifoam. In this terminology, the smaller R the better the antifoam.

The following results are obtained:

|  | % residual foam |
| --- | --- |
| Example | 23 |
| Comparative Example |  |
| 1 | 34 |
| 2 | 40 |
| 3 | 63 |

We claim:

1. An oil-in-water emulsion comprising an oil phase and an aqueous phase in which the oil phase accounts for from 5 to 50% by weight of the emulsion and said oil phase consists essentially of a mixture of
   (a) fatty esters of $C_{12}$–$C_{22}$-carboxylic acids with monohydric to trihydric $C_1$–$C_{22}$-alcohols,
   (b) polyglyceryl esters which are obtainable by at least 20% esterification of polyglycerols which contain at least 2 glyceryl units with at least one $C_{12}$–$C_{36}$-fatty acid and
   (c) fatty esters of $C_{12}$–$C_{22}$-carboxylic acids and polyalkylene glycols, the molecular weight of the polyalkylene glycols being up to 5,000 g/mol, and, if required,
   (d) alcohols of at least 12 carbon atoms, fatty esters of alcohols of at least 22 carbon atoms and $C_1$–$C_{36}$-carboxylic acids, distillation residues which are obtainable in the preparation of alcohols having a relatively large number of carbon atoms by oxo synthesis or by the Ziegler process and which may be alkoxylated, or a mixture of the stated compounds or
   (e) hydrocarbons having a boiling point above 200° C. or fatty acids of 12 to 22 carbon atoms.

2. A method for foam control in pulp digestion, in the beating of paper stock, in papermaking and in dispersing pigments for papermaking, comprising:
   adding the oil-in-water emulsion of claim 1 in an amount of from 0.02 to 0.5 part by weight per 100 parts by weight of a foam-forming medium.

3. A method for deaerating paper stocks, comprising:
   adding the oil-in-water emulsion of claim 1 in an amount of from 0.02 to 0.5 part by weight per 100 parts by weight of paper stocks.

4. The oil-in-water emulsion of claim 1, which contains 1 to 90% by weight, based on the total weight of the oil phase, of component (a).

5. The oil-in-water emulsion of claim 4, which contains 40 to 80% by weight, based on the total weight of the oil phase, of component (a).

6. The oil-in-water emulsion of claim 1, which contains 1 to 80% by weight, based on the total weight of the oil phase, of component (b).

7. The oil-in-water emulsion of claim 6, which contains 5 to 20% by weight, based on the total weight of the oil phase, of component (b).

8. The oil-in-water emulsion of claim 1, which contains 1 to 80% by weight, based on the total weight of the oil phase, of component (c).

9. The oil-in-water emulsion of claim 8, which contains 5 to 20% by weight, based on the total weight of the oil phase, of component (c).

10. The oil-in-water emulsion of claim 1, which contains up to 80% by weight, based on the total weight of components (a), (b) and (c), of component (d).

11. The oil-in-water emulsion of claim 10, which contains up to 10% by weight, based on the total weight of components (a), (b) and (c), of component (d).

12. The oil-in-water emulsion of claim 1, which contains up to 50% by weight, based on the total weight of components (a), (b) and (c), of component (e).

13. The oil-in-water emulsion of claim 12, which contains up to 20% by weight, based on the total weight of components (a), (b) and (c), of component (e).

14. An oil-in-water emulsion comprising an oil phase and an aqueous phase in which the oil phase accounts for from 5 to 50% by weight of the emulsion and said oil phase consists essentially of a mixture of (a) fatty esters of $C_{12}$–$C_{22}$-carboxylic acids with monohydric to trihydric $C_1$–$C_{22}$-alcohols, (b) polyglycoryl esters which are obtained by at least 20% esterification of polyglycerols which contain at least 2 glyceryl units with at least one $C_{12}$–$C_{36}$-fatty acid and (c) fatty esters of $C_{12}$–$C_{22}$-carboxylic acids and polyalkylene glycols, the molecular weight of the polyalkylene glycols being up to 5,000 g/mol, and, if required, (d) alcohols of at least 12 carbon atoms, fatty esters of alcohols of at least 22 carbon atoms and $C_1$–$C_{36}$-carboxylic acids, distillation residues which are obtained in the preparation of alcohols having a relatively large number of carbon atoms by oxo synthesis or by the Ziegler process and which may be alkoxylated, or a mixture of the stated compounds or (e) hydrocarbons having a boiling point of above 200° C. or fatty acids of 12 to 22 carbons atoms, which further comprises (f) a surfactant selected from the group consisting of salts of higher fatty acids, oxyalkylated alkylphenols, oxyethylated unsaturated oils, salts of sulfated oxyethylation products of nonylphenol or octylphenol, benzenesulfonic acid, salts of benzenesulfonic acid, alkylbenezenesulfonic acids and salts thereof.

15. The oil-in-water emulsion of claim 14, comprising 0.1 to 5 parts by weight of component (f) for every 100 parts by weight of components (a), (b), (c) and (d).

* * * * *